May 21, 1935.  J. BRANDL  2,001,865
GAS DENSITY METER
Filed Dec. 10, 1932
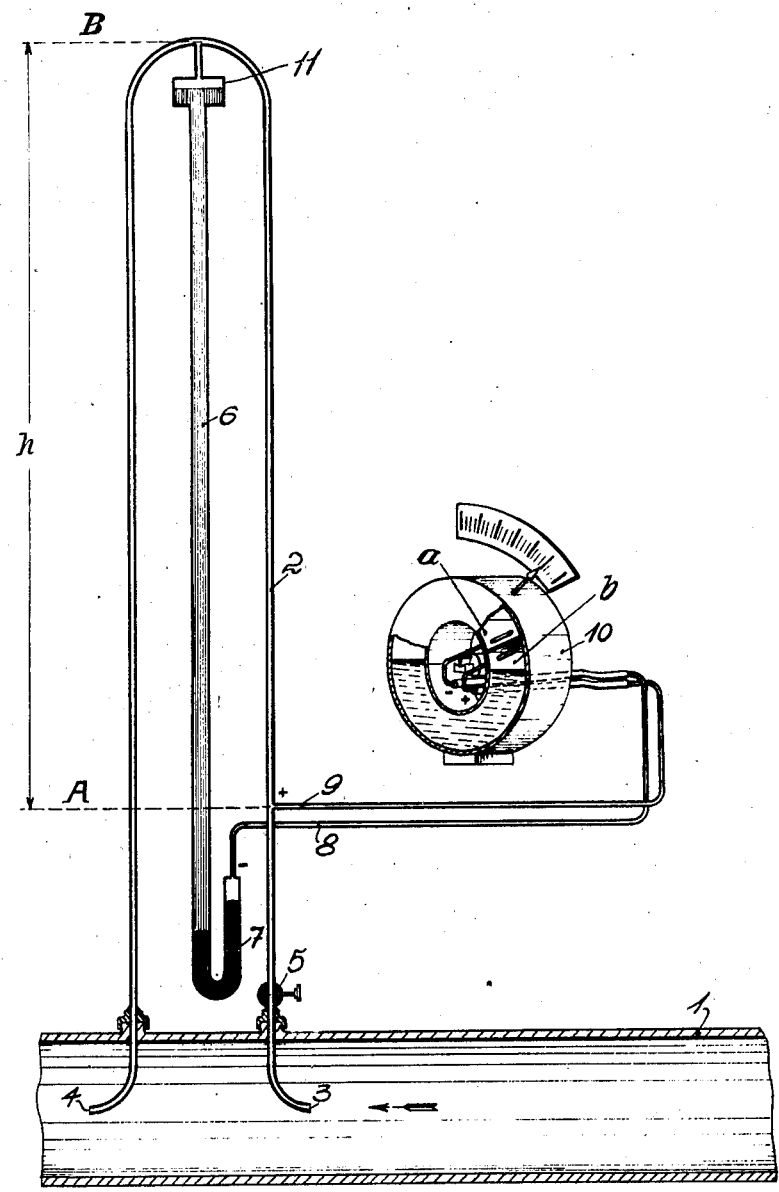

Patented May 21, 1935

2,001,865

UNITED STATES PATENT OFFICE 2,001,865

GAS DENSITY METER

Johann Brandl, Vienna, Austria, assignor to the firm Compagnie pour la Fabrication des Compteurs et Matériel d'Usines à Gaz, Montrouge (Seine), France Application December 10, 1932, Serial No. 646,617
In Austria December 11, 1931

4 Claims. (Cl. 265—44)

This invention relates to gas density meters. It is possible, to determine the density or specific gravity of the gas in a vessel, tube, or the like, by connecting to this vessel a stand-pipe, and measuring the weight of the column of gas in this stand-pipe. If, however the stand-pipe communicates at its upper end with the atmosphere or with another gas chamber, for the purpose of enabling the gas column to be constantly renewed, the density measurement will be subject to the varying influence of the pressure of the atmosphere or of the gas in the said chamber, and will therefore be inaccurate, or will necessitate complicated correction work.

In accordance with the present invention this drawback is obviated by the arrangement that the stand-pipe communicates only with the measuring vessel, and is unaffected by outside influences. A column of gas is then formed in a stand-pipe in which the gas pressure varies only to the extent of the static pressure due to the weight of the said column. If then a differential pressure gauge be connected to the stand-pipe, this gauge being adapted to register the drop in pressure or to transmit the same as a measured quantity to another measuring appliance, the indication or measured quantity thus obtained is a criterion of the density of the gas at the time of measurement.

In the practical realization of this principle of gas density measurement it is advisable, more particularly when the density of flowing gas is to be measured, to connect a branch tube containing the stand-pipe parallel to the gas flow traversing the measuring vessel. In this manner a weak flow is maintained automatically in the branch tube, which flow constantly renews the gas column in the stand-pipe with fresh gas, so that the gas density of the column is always absolutely equal to that of the gas in the measuring vessel. The pressure difference in the column remains practically unaffected by this weak flow.

One form of the invention is shown by way of example diagrammatically (but by no means to scale) in the accompanying drawing. In this drawing 1 denotes the measuring vessel, in the present instance a tube through which the gas, the density of which is to be continuously measured, flows. Into this tube 1 there issue the open ends 3 and 4 of the limbs of a vertically mounted U-tube 2 the one limb of which the right-hand limb of the drawing) serves as a stand-pipe in accordance with the present invention. Both these ends 3 and 4 are bent over in the direction of the gas flow. As a rule the height of the U-tube will be from 6 to 10 meters, in order that the measuring results obtained shall be sufficiently accurate.

The differential pressure gauge, in the present example a ring balance 10, is connected on the one hand to the lower portion of the stand-pipe at the level A, and, on the other hand, to the crest of the U-tube 2 (at the level B). The difference in the pressure of the gas column enclosed within the stand-pipe as between the levels A and B will thus be measured, and this difference of pressure always amounts, irrespective of the absolute gas pressure and of atmospheric conditions, to $\gamma h$, $h$ being the height of the gas column and $\gamma$ the specific gravity (density) of the gas.

The pressure of the gas at the level A in the stand-pipe is directly transmitted through the gas pipe 9 to the gas chamber $b$ of the ring balance 10. On the other hand the pressure of the gas at the crest of the U-tube 2, that is to say at the level B, is indirectly transmitted, namely through the intermediary of columns of liquid, to the gas chamber $b$ of the ring balance 10. Adjoining the crest of the U-tube 2 and extending in a downward direction there is provided the tube 6 which is filled with water or oil, and which terminates at its lower end in a U-shaped bent portion 7 which is filled with mercury. To the free end of this portion 7 there is attached the pipe 8 communicating with the gas chamber $a$.

It will be clear without further explanation that in an arrangement of the described nature the pressure of the gas at the crest of the U-tube 2 will be the same as that in the pipe 8, in spite of the length of the tube 6. Near its connection to the U-tube 2, the tube 6 is enlarged to form a chamber 11 of sufficiently large cross-sectional area to maintain a practically constant level of the liquid in the chamber 11, irrespective of variations of the gas pressure.

According to the arrangement of the tube ends 3 and 4 within the measuring tube 1 there is caused to pass constantly through the U-tube 2 a very weak flow of gas which can be regulated by means of the needle valve 5. This gas flow exerts no influence upon the measuring process, but ensures that fresh gas is constantly supplied to the stand-pipe.

It is to be understood that the precise manner of carrying out the invention can be different from that described by way of example. It is more particularly possible to modify in various ways the disposition of the piping and also the manner in which the difference of pressure is measured. It is however essential in every case that the difference of pressure to be measured shall be dependent upon the height of the gas column and upon the specific gravity of this column, and upon these factors alone.

I claim:

1. In a device for measuring the density or specific gravity of a gas flowing through a conduit, a by-pass of the said conduit, arranged so as to allow a slow flow of the gas therethrough and comprising an inverted U-shaped pipe one limb of which constitutes a stand-pipe adapted to permit of the formation therein of a continuously renewed gas column having a pressure difference between two different levels substantially equal to the static pressure due to the weight of the column, and means adapted to be influenced by the said difference of pressure, said means being connected to the U-shaped pipe at the crest and near the lower end of said limb.

2. In a device for measuring the density or specific gravity of a gas flowing through a conduit, a by-pass of the said conduit, arranged so as to allow a slow flow of the gas therethrough and comprising an inverted U-shaped pipe one limb of which constitutes a stand-pipe adapted to permit of the formation therein of a continuously renewed gas column having a pressure difference between two different levels substantially equal to the static pressure due to the weight of the column, a differential-pressure indicating device, and means whereby said indicating device is connected to the stand-pipe at two different levels of the gas column so as to indicate the difference of pressure between these levels, said means including an upright U-shaped tube containing a balanced liquid column connecting one side of said differential-pressure indicating device with the said stand-pipe at one of the said gas column levels thereof so as to transmit the pressure existing at this level substantially to the height of the other gas column level.

3. In a device for measuring the density or specific gravity of a gas flowing through a conduit, a by-pass of the said conduit, arranged so as to allow a slow flow of the gas therethrough, a stand-pipe forming part of the said by-pass and being adapted to permit of the formation therein of a continuously renewed gas column having a pressure difference between two different levels substantially equal to the static pressure due to the weight of the column, a differential-pressure indicating device, and means whereby said indicating device is connected to the stand-pipe at two different levels of the gas column so as to indicate the difference of pressure between these levels, said means including an upright U-shaped tube containing a balanced liquid column, connecting one side of said differential-pressure indicating device with the said stand-pipe at one of the said gas column levels thereof so as to transmit the pressure existing at this level substantially to the height of the said indicating device, said U-shaped tube being enlarged in the vicinity of its connection to the stand-pipe so as to form there a chamber adapted to permit of the formation therein of a boundary surface of the liquid-filling, in contact with the gas flowing through the stand-pipe, the cross-sectional area of said chamber being sufficiently large with respect to the cross-sectional area of the liquid-filled tube to maintain the level of the said boundary surface materially constant irrespective of the variations of the gas pressure acting upon said surface.

4. In a device for measuring the density or specific gravity of a gas flowing through a conduit, a by-pass of the said conduit, arranged so as to allow a slow flow of the gas therethrough, a stand-pipe forming part of the said by-pass and being adapted to permit of the formation therein of a continuously renewed gas column having a pressure difference between two different levels substantially equal to the static pressure due to the weight of the column, a differential-pressure indicating device comprising two gas-filled chambers and a gauge responsive to the difference of gas pressure between said chambers, and means for transmitting the pressures existing at the two different levels of the said gas column to both chambers so as to have between the gas fillings of the chambers the same difference of pressure as between the said levels, said means including a liquid-filled conduit system adapted to transmit the pressure existing at one of the said two gas column levels, substantially to the height of one of the said gas-filled chambers.

JOHANN BRANDL.